(12) United States Patent
Hashi et al.

(10) Patent No.: US 7,230,798 B2
(45) Date of Patent: Jun. 12, 2007

(54) HEAD SUPPORT DEVICE AND DISK DRIVE USING THE SAME

(75) Inventors: Hideyuki Hashi, Osaka (JP); Hideki Kuwajima, Kyoto (JP); Yoshihiro Ueno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 447 days.

(21) Appl. No.: 10/803,977

(22) Filed: Mar. 19, 2004

(65) Prior Publication Data

US 2004/0246624 A1 Dec. 9, 2004

(30) Foreign Application Priority Data

Mar. 20, 2003 (JP) .............................. 2003-078033

(51) Int. Cl.
*G11B 5/60* (2006.01)
*G11B 21/21* (2006.01)

(52) U.S. Cl. .............................. 360/244.2; 360/244.8; 360/245; 360/245.3

(58) Field of Classification Search ............ 360/244.2, 360/244.5, 244.8, 245, 245.3
See application file for complete search history.

(56) References Cited

U.S. PATENT DOCUMENTS

| 5,936,803 | A | * | 8/1999 | Berding ................... 360/244.8 |
| 6,052,259 | A | | 4/2000 | Mita et al. |
| 6,057,986 | A | * | 5/2000 | Takasugi ................. 360/245.9 |
| 6,181,526 | B1 | | 1/2001 | Summers |
| 7,068,469 | B2 | * | 6/2006 | Kuwajima et al. ........ 360/244.5 |
| 2002/0126419 | A1 | * | 9/2002 | Kuwajima et al. ........ 360/265.7 |
| 2002/0145822 | A1 | * | 10/2002 | Kuwajima et al. ........ 360/97.01 |
| 2003/0161073 | A1 | * | 8/2003 | Horie et al. ............. 360/244.2 |
| 2003/0165032 | A1 | * | 9/2003 | Miyamoto et al. ........ 360/264.1 |
| 2004/0184193 | A1 | * | 9/2004 | Honda et al. ............ 360/244.2 |
| 2005/0073776 | A1 | * | 4/2005 | Honda et al. ............ 360/265.7 |
| 2005/0128644 | A1 | * | 6/2005 | Wada et al. ............. 360/244.2 |
| 2006/0056111 | A1 | * | 3/2006 | Ueno et al. ............. 360/244.2 |

FOREIGN PATENT DOCUMENTS

| JP | 59107450 | A | * | 6/1984 |
| JP | 01292682 | A | * | 11/1989 |
| JP | 03203055 | A | * | 9/1991 |
| JP | 05282819 | A | * | 10/1993 |
| JP | 08022649 | A | * | 1/1996 |
| JP | 9-82052 | | | 3/1997 |
| JP | 11-39808 | | | 2/1999 |
| JP | 2001052388 | A | * | 2/2001 |
| JP | 2001135054 | A | * | 5/2001 |

* cited by examiner

*Primary Examiner*—William J Klimowicz
(74) *Attorney, Agent, or Firm*—Wenderoth, Lind & Ponack, L.L.P.

(57) ABSTRACT

A low profile head support device has excellent shock resistance and can apply necessary and sufficient biasing forces to a head and a disk drive using the same. The head support device includes a head; head suspension 2 to suspend the head; base arm 4 pivotally secured to actuator axis 10, suspending the head suspension; pivot fulcrum 5 to movably suspend head suspension 2; and spring member 2e to apply a biasing force to head suspension 2, wherein pivot fulcrum 5 is disposed on base arm 4. The head support device can be used in various kinds of information devices such as data processing devices, magneto optical disk drives, optical disk drives or the like.

12 Claims, 9 Drawing Sheets

(a)

(b)

(c)

(a)

(b)

(c)

HEAD SUPPORT DEVICE AND DISK DRIVE USING THE SAME

FIELD OF THE INVENTION

The present invention relates to a head support device to read/write data on a disk using a floating head and a disk drive using the same.

BACKGROUND ART

The hard disk drive (or HDD) to read/write information on a magnetic disk (or disk) employs the disk as a storage medium and read/write data on the disk surface using a magnetic head (or head). The HDD typically comprises a head support device that suspends the head at a predetermined floating height over the disk surface to move the head to a target location on the disk radially.

An example of the head support device with the floating head in a conventional HDD is described as follows with reference to FIGS. 8 and 9. FIG. 8 is a plan view showing the main structure and relation between the head support device and the disk ("disk" also referred to as "recording medium"). FIG. 9 is a perspective view showing the main structure of the head support device in a conventional HDD.

Head support device 91 comprises: comparatively less rigid head suspension ("head suspension" also referred to as "support arm") 92; plate spring 93; comparatively more rigid base arm 94; slider 95 mounted on the surface of one end of head suspension 92 facing disk 98; and a head (not shown) mounted on slider 95 as shown in FIGS. 8 and 9. Head suspension 92 with comparatively less rigidity is bent to form plate spring 93 at one end, and plate spring 93 is connected to base arm 94. Moreover, base arm 94 is secured rotatably on bearing 96, and head support device 91 can move pivotally within a predetermined angle to a target location on the disk radially using actuator 97 connected to base arm 94. Additionally, head actuator 90 consists of head support device 91, bearing 96 and actuator 97.

Disk 98 rotates at a predetermined speed by disk driving means 99. During a reading/writing operation of the HDD, balance between the floating force by air flow generated during rotation of disk 98 and biasing force against the disk surface suspends slider 95 at a predetermined floating height over the disk surface, and the head mounted to slider 95 reads and/or writes data over the disk surface at a predetermined floating height. Plate spring 93 formed on head support device 91 mainly provides slider 95 with the biasing force against the disk surface. Head support device 91 moves pivotally around bearing 96 as a rotation center using actuator 97 connected to base arm 94 to transport the head mounted on slider 95, floating over the disk surface at a predetermined floating height, to a target track location for reading/writing operation.

In the aforementioned head support device 91, floating at a predetermined height over the disk surface, plate spring 93 provided on head suspension 92 must have a function to allow slider 95 to follow disk 98 steadily under fluctuation of biasing forces caused by product quality fluctuation, in a case of vertical shock of disk 98. Therefore, head suspension 92 has typically a thin-plate or apertured structure with lower rigidity as well as a smaller spring constant to provide head support device 91 with a certain level of flexibility. To withstand and absorb external shocks on slider 95, various methods are presented, such as setting the center-of-mass of head support device on a specific position or adding a counter weight to cancel shocking loads (for example, see Japanese Patent Unexamined Publication No. 09082052 and H11-039808).

However, in the head support device used in conventional HDDs, a vibration mode such as torsion or the like occurs in positioning the head support device to a target track by pivotal movement because of the lowered resonance frequency owe to the adoption of thin-plate structure of head suspension 92. The drawback is that the time necessary to stabilize the vibration mode increases the reading/writing access time.

Additionally, the conventional structure must absorb external shocks by forming an arch in the thin-plate structure. Upon loading strong external shocks on the head support device, therefore, balance between the floating force by air flow generated in rotation of the disk and biasing force against the disk surface is disturbed to cause a possible risk of the slider 95 jumping from the disk surface because rigidity is especially lower in the slider mounting portion of the head suspension. The slider 95 sometimes collides with the disk by strong external shocks causing damages magnetically or mechanically. The problem is commonly observed in disk drives using the floating head system, such as optical disk drive, magneto-optical disk drive or the like.

Moreover, along with the downsizing trend of PCs, small sized and especially low profile HDD is required urgently. A low profile design is, therefore, needed for head support device that is a main component of the hard disk drive.

SUMMARY OF THE INVENTION

To solve the aforementioned problems, the present invention aims at providing a low profile head support device having an excellent shock resistance while applying necessary and sufficient biasing forces on a head and a disk drive using the same.

To fulfill the purpose, the head support device of the present invention includes: a read and/or write head for recording information on a recording medium and/or reproducing the information from the recording medium, the recording medium rotating around an axis of rotation of the recording medium; a slider mounted with the head; a support arm rotatable around (operable to pivot about) a first axis, the first axis being parallel to the axis of rotation of the recording medium and located away from the axis of rotation of the recording medium; a flexure for disposing the slider at a first end of the support arm; a spring member for applying a specified thrust force to the head in a read position and/or writing position, the spring member having lower rigidity than the support arm; and a base arm rotatable around the first axis together with the support arm, the base arm being rotated by a driving means and coupled to the support arm by the spring member.

The support arm supports the slider at the first end thereof and, is pivotal around a second axis which is perpendicular to the first axis and goes through a pivot fulcrum where the base arm and support arm contact each other. The flexure is fixed to the support arm in the vicinity of the pivot fulcrum, and the pivot fulcrum can be set on the top or bottom surface of the base arm, or can be placed between the surfaces in the thickness direction of the base arm. The structure enables the size increase due to the introduction of pivot fulcrum in the thickness direction of the base arm to be minimized to produce a low profile HDD. Additionally, due to the increased rigidity and higher resonance frequency, the access time of the support arm can be improved significantly.

It is an aspect of the invention that the pivot fulcrum is disposed on a tip of the base arm of the head side, or is disposed on the tip edge of the actuator arm of the head side, enabling the support arm to lay on the tip of the base arm. Therefore, a low profile downsized head support device with a high rigidity is realized due to the simple way to form the pivot fulcrum, as the base arm has a necessary and sufficient length, and the deflection of the base arm due to shocks is restrained.

It is another aspect of the invention that the center of mass of the support arm is located on the point or in the vicinity of the pivot fulcrum. According to this structure, the center of mass of the support arm can be suspended on the point or in the vicinity of the pivot fulcrum. Therefore, lesser torque force is applied on the head in case of shocks as the shock resistance of the support arm is improved.

It is yet another aspect of the invention that the head support device has the following structures: apertures provided in the base arm; apertures provided in two places; a portion of the support arm disposed in a space of an aperture; a spring member made of resilient materials; and the base arm positioned between the support arm and the recording medium. As a result, the support arm is attached to the base arm in two surfaces; one portion stacked on the top surface to form the pivot fulcrum and another portion welded on the bottom surface. An intermediate portion is created between the stacked and welded portions of the support arm. The support arm can be pivoted around the pivot fulcrum using a deflection of the intermediate portion, resulting in little increase in the thickness of the base arm itself. The structure can reliably prevent the head or recording medium from being damaged due to the clash of the slider on the surface of the recording medium in case of external shock or during loading/unloading. The access time of the support arm can be improved by an increased rigidity and a higher resonance frequency.

It is another aspect of the invention that a spring member is adopted for the intermediate portion to secure the support arm on the base arm. A suitable material for the spring member can improve pivotal functions of the support arm on the pivot fulcrum and can increase the rigidity of the support arm. The structure can minimize the increase in thickness of the support arm to produce a low profile head support device. As the securing positions of the spring member have a function to reinforce the strength of the base arm, the base arm can suspend the support arm. Therefore, a low profile head support device with a more rigid base arm can be realized. Moreover, the structure of the head support device can be simplified by reducing parts to reinforce the strength of the base arm. It is another aspect of the invention that the spring member is secured on a surface of the base arm. The structure also contributes to realize a low profile head support device as the elastic deformation of the spring member can be within the thickness of the base arm.

The disk drive of the present invention includes: a recording medium; a driving means to rotate the recording medium; a read and/or write head for recording information on a recording medium and/or reproducing the information from the recording medium, the recording medium rotating around an axis of rotation of the recording medium; a support arm rotatable around a first axis, the first axis being parallel to the axis of rotation of the recording medium and located away from the axis of rotation of the recording medium; a flexure for disposing the slider at a first end of the support arm; a spring member for applying a specified thrust force to the head in a read position and/or writing position, the spring member having lower rigidity than the support arm; and a base arm rotatable around the first axis together with support arm, the base arm being rotated by driving means and coupled to the support arm by the spring member. The support arm supports the slider at the first end thereof, and is pivotal around a second axis which is perpendicular to the first axis, where the base arm and support arm contact each other, and the flexure is fixed to the support arm in the vicinity of the pivot fulcrum. The base arm is positioned in a place between the support arm and the recording medium. Additionally, the pivot fulcrum of the head support device is set on the top or bottom surface of the base arm, or is placed between the surfaces in the thickness direction of the base arm. An assembly is incorporated with the support arm and the spring member on the recording medium side, and head signal wirings from the head is disposed at the base arm side through the support arm, the spring member and the assembly.

The structure can realize a low profile disk drive with excellent shock resistance, while applying a necessary and sufficient biasing force to the head.

BRIEF DESCRIPTION OF THE DRAWINGS

FIG. 2 (*b*) is a sectional view taken along the line A—A in FIG. 2 (*a*).

FIG. 2 (*c*) is a plan view of the head support device viewed from the disk side in accordance with exemplary embodiment 1 of the present invention.

FIG. 2 (*d*) is a plan view showing the support arm of the head support device only in accordance with exemplary embodiment 1 of the present invention.

FIG. 2 (*e*) is a plan view showing a base arm of the head support device only in accordance with exemplary embodiment 1 of the present invention.

FIG. 4 (*b*) is a plan view of the head support device with another structure viewed from the slider side in accordance with exemplary embodiment 1 of the present invention.

FIG. 5 (*b*) is a partial exploded sectional view in the vicinity of the base arm of the head support device in accordance with exemplary embodiment 1 of the present invention.

FIG. 5 (*c*) is a partial exploded sectional view in the vicinity of the base arm of another head support device in accordance with exemplary embodiment 1 of the present invention.

FIG. 6 (*b*) is a plan view of the support arm viewed from the disk side.

FIG. 6 (*c*) is a sectional side view taken along the centerline of the support arm with another structure.

DETAILED DESCRIPTION OF THE INVENTION

Now, the exemplary embodiments of the present invention are described with reference to the drawings.

Exemplary Embodiment 1

Figure 1:
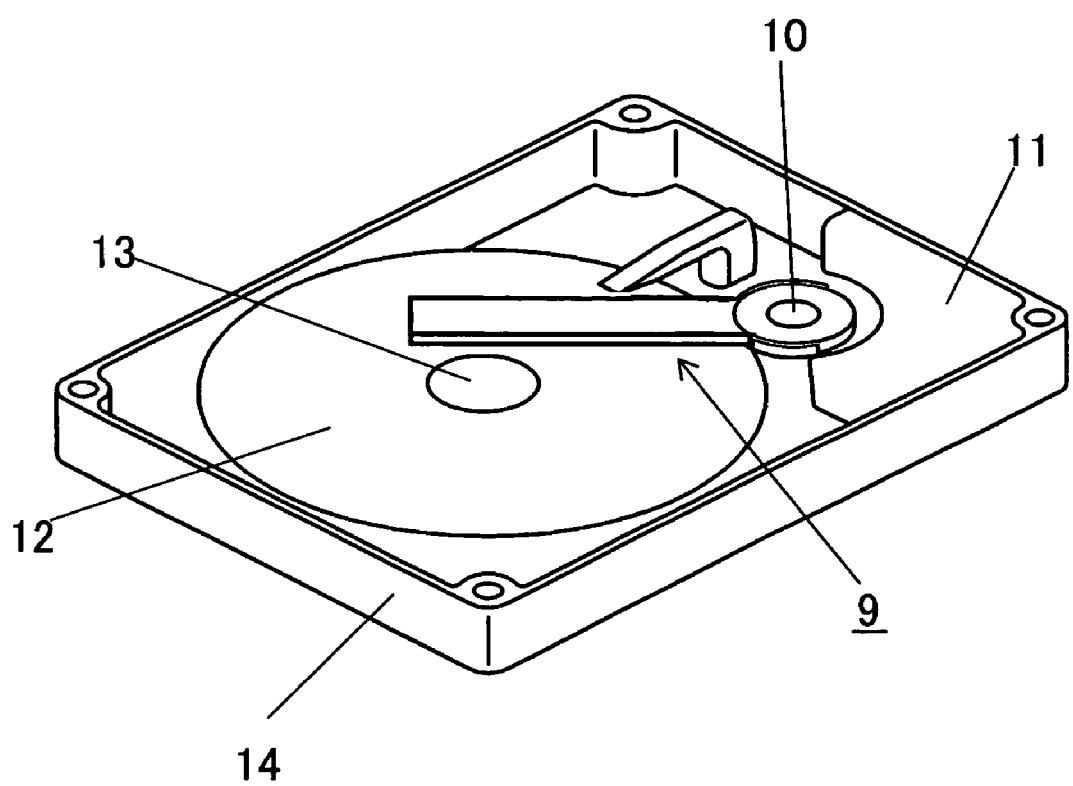
FIG. 1 is a perspective view of a disk drive with a head support device in accordance with exemplary embodiment 1 of the present invention.
Figure 2A:
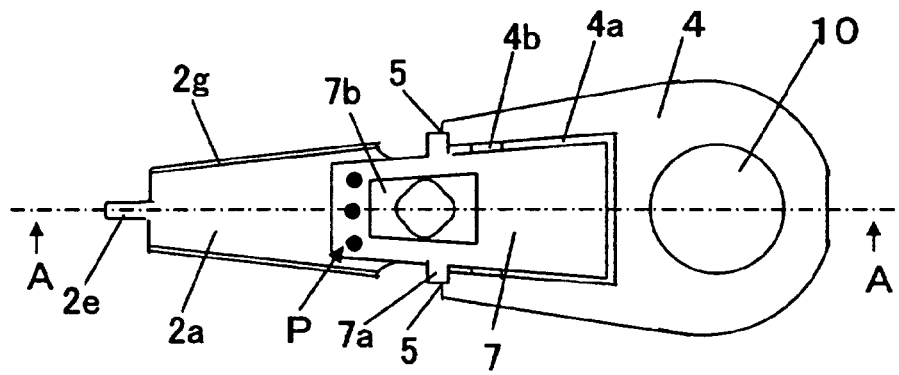
FIG. 2 (*a*) is a plan view of the main structure of the head support device in accordance with exemplary embodiment 1 of the present invention.
Figure 2B:
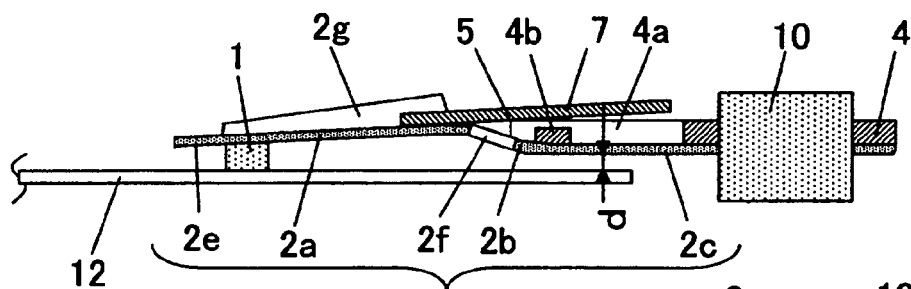
Figure 2C:
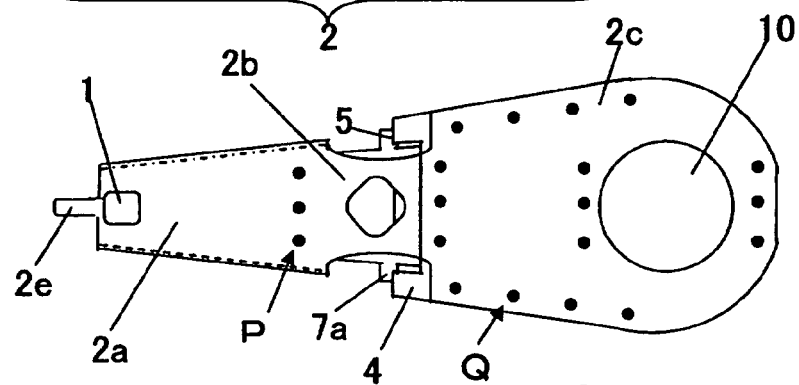
Figure 2D:
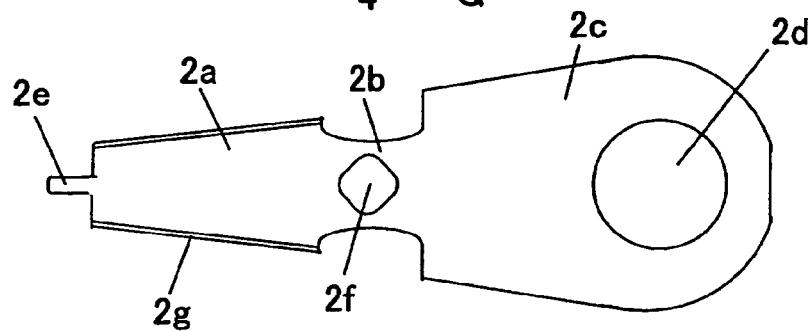
Figure 2E:
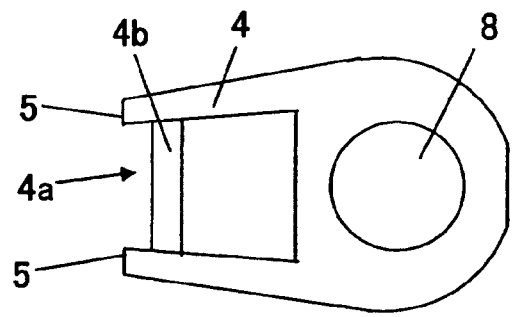

FIG. 1 is a perspective view of the disk drive with a head support device in accordance with exemplary embodiment 1 of the present invention. A magnetic data reproduction device is explained as an example of hard disk drives.

Head support device 9 provided with the head suspension (or support arm) is secured rotatably on actuator axis 10 as shown in FIG. 1. An actuator 11 for head support device 9 (or actuator 11) is disposed on the side opposite to the head suspension on head support device 9 across actuator axis 10. Using a known technique such as applying a control current to actuator 11, using a voice coil motor or the like, actuator 11 can move a magnetic head (or head) mounted on the slider (head and slider are not shown) for positioning the head at a target track on the disk ("disk" also referred to as "recording medium") 12. A linear motor, for instance, other than the aforementioned voice coil motor, can be used as actuator 11.

On the other hand, disk driving means 13 can rotate disk 12 at a predetermined rotating speed. A spindle motor, for instance, can be used as disk driving means 13. Securing the components in predetermined positions, case 14 is hermetically sealed with a cover (not shown) to prevent the disk and head from causing unwanted damage due to ingresses of outside air or fine dusts.

Figure 3:
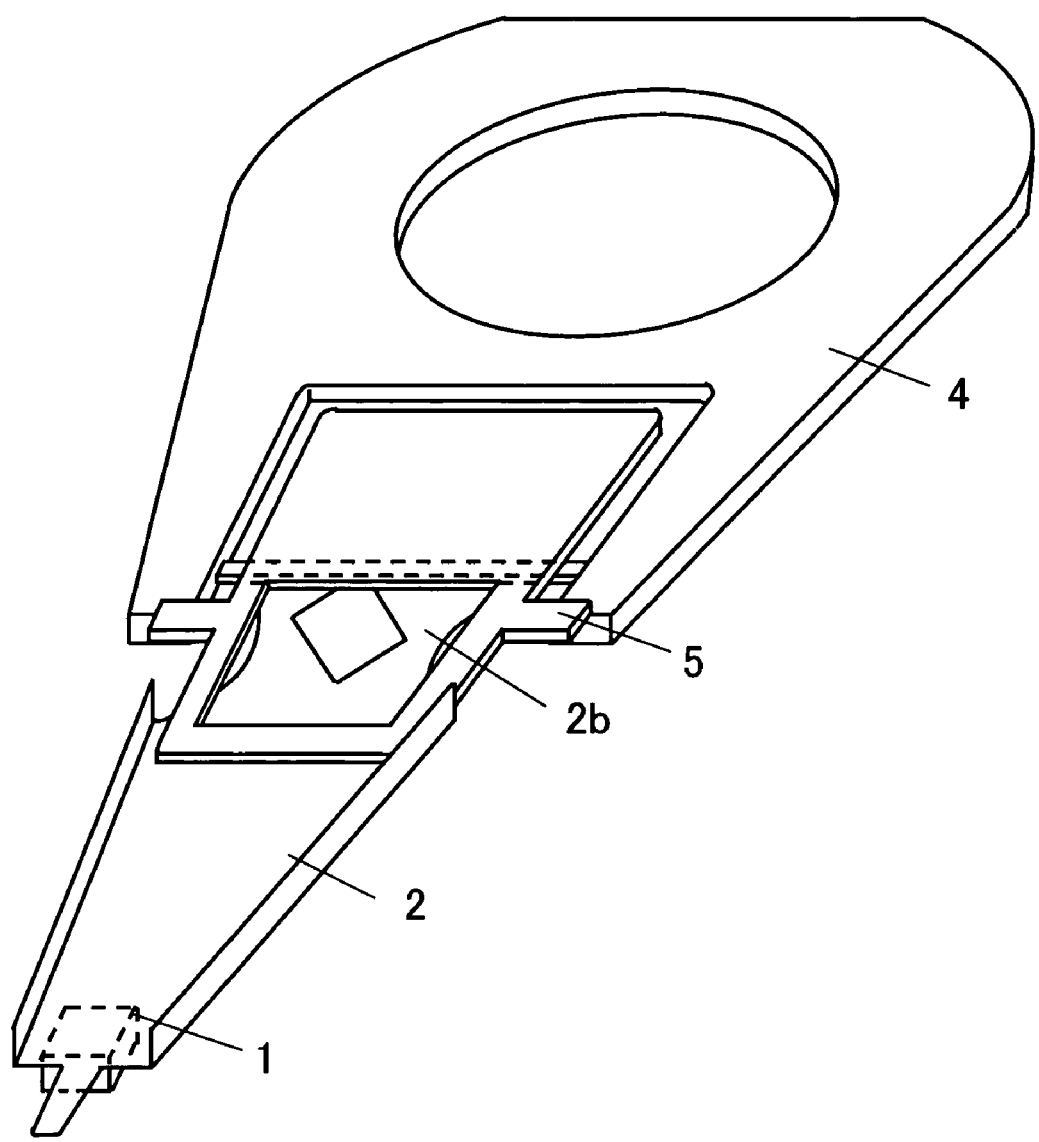
FIG. 3 is a perspective view of the main structure of the head support device in accordance with exemplary embodiment 1 of the present invention.

Next, the head support device provided in the HDD of exemplary embodiment 1 is described with reference to FIGS. 2 and 3.

FIG. 2 (a) is a plan view showing the main structure of the head support device, FIG. 2 (b) is a sectional view taken along the line A—A in FIG. 2 (a), FIG. 2 (c) is a plan view showing the head support device viewed from the disk side, FIG. 2 (d) is a plan view showing the head suspension only, and FIG. 2 (e) is a plan view showing the base arm only. FIG. 3 is a perspective view showing the main structure of the head support device in accordance with exemplary embodiment 1 of the present invention.

As shown in FIGS. 2 (b) and 2 (d), the head suspension (or support arm) 2 comprises: head holder 2a (or holder 2a); spring member 2b such as a plate spring; mounting portion 2c; circular through hole 2d for actuator axis 10; tab 2e for loading/unloading; aperture 2f; and side runners 2g. Slider 1 carrying the head (not shown) is secured to holder 2a directly or via a flexure for head wirings, and base arm 4 is stacked on mounting portion 2c and is welded at a plurality of points, for instance as indicated by Q. The welding secures these two components to form an incorporated structure as shown in FIG. 2 (c). A flexure for head wirings will be discussed later. Aperture 2f is formed for light weighting and to control the spring characteristics of spring member 2b. Although aperture 2f is shown diamond-shaped in FIG. 3, or with fillets in the corners of the diamond shape in FIG. 2, the shaping is not so limited in the present invention. Base arm 4 is secured to actuator axis 10 rotatably (pivotably) through bearing 8.

The incorporated structure of head suspension 2 and base arm 4 can increase the effective thickness of the base arm 4 without an increase in dimensional thickness of the base arm 4 itself. Therefore, head suspension 2 functions to strengthen base arm 4 mechanically, and especially to increase the flexural rigidity. Consequently, as the base arm deflects slightly in case of shocks, the distance d between head support device 9, shown in FIG. 2 (b), and disk 12 can be reduced. The structure greatly contributes to producing a low profile head support device 9.

Next, balancer 7 is secured on the surface of holder 2a of head suspension 2, opposite to the surface equipped with slider 1, by spot welding at, for example, a plurality of points indicated by P as shown in FIG. 2 (a). Balancer 7 is laid on the top surface of base arm 4 such that the balancer balances at the tip edge acting as pivot fulcrum 5. An elastic deformation of spring member 2b of head suspension 2 in the thickness direction of base arm 4 causes slider 1, mounted movably in a vertical direction, to apply a biasing force against the surface of disk 12 through head suspension 2. On the bottom side of base arm 4, opposite to the side on which head suspension 2 is laid, base arm 4 secures mounting portion 2c of head suspension 2. Balancer 7 has two protrusions 7a on both sides and aperture 7b, which will be discussed later, and protrusions 7a contact the tip edge of base arm 4 to form pivot fulcrum 5. Additionally, balancer 7 has aperture 7b to balance the center of total mass of holder 2a, side runners 2g, slider 1, and balancer 7 with pivot fulcrum 5, and to reduce the total mass.

According to this structure, an amount of elastic deformation of spring member 2b of head suspension 2 is limited within the thickness of base arm 4. Therefore, the elastic deformation of spring member 2b using pivot fulcrum 5 causes little increase in the thickness of base arm itself, which can contribute to producing the low profile head support device 9.

Additionally, pivot fulcrum 5 formed at the tip edge of base arm 4 can provide base arm 4 with a necessary but minimum length, which can restrain the deflection of base arm 4 effectively in case of shocks. The structure can prevent the surface of disk 12 from causing damage due to a clash because head suspension 2 is secured on the side opposite to disk 12 across more rigid base arm 4 and balanced on pivot fulcrum 5. Aperture 4a is provided on base arm 4 to prevent base arm 4 from touching balancer 7.

Upon reading and/or writing on disk 12, as shown in FIG. 2 (b), head suspension 2 is suspended on pivot fulcrum 5 provided on the tip edge of base arm 4 in a slightly inclined posture against base arm 4, keeping the mounting portion equipped with slider 1 in a lower position, due to the elastic deformation of spring member 2b, which will be discussed later. Thus, a predetermined biasing force is applied to slider 1 in a direction perpendicular to the disk surface. The biasing force applied to slider 1 in the direction perpendicular to the disk surface is a bending moment, generated in spring member 2b of head suspension by the elastic deformation, and is changed as a compression stress and transferred from pivot fulcrum 5 to head suspension 2. As a countermeasure, taking the balance of torque around pivot fulcrum 5 (acting as a center) of head suspension 2 incorporated with balancer 7 into account, head suspension 2 can be set so as not to be divided from pivot fulcrum 5 in case of shocks by setting parameter values such as the shape and mass of balancer 7, position of pivot fulcrum 5, and fixing positions of head suspension with balancer 7, accordingly.

For example, in exemplary embodiment 1 of the present invention, head suspension 2 has a structure such that the center of mass including slider 1 is located in the vicinity of pivot fulcrum 5 longitudinally in a direction perpendicular to the disk surface. Therefore, no bending moment occurs on pivot fulcrum 5 of head suspension 2 with well balanced vertically moving forces even if receiving external shocks. Slider 1 will never touch the surface of disk 12, preventing a head (not shown) or disk 12 from causing damages do to the clash of slider 1 on the surface of disk 12

Moreover, head suspension 2 is provided with side runners 2g, having approximately the same shape over the entire length, made by bending along both the right and left sides longitudinally. The side runners 2g contribute to strengthen the rigidity of head suspension 2 and can increase the resonance frequency of head support device 9. Additionally, when head support device 9 moves pivotally for positioning to target tracks on disk 12, no extra time is required to stabilize the vibration mode of torsion or the like, which can improve the read/write access time. The material to use for making head suspension 2, base arm 4 and balancer 7 is selected among carbon steel, stainless steel, or similar materials, and they can be formed by pressing or etching. Additionally, head suspension 2 can be secured to base arm 4 and balancer 7 using well-known ultrasonic welding, laser welding or similar techniques other than spot welding. Pivot fulcrum 5 can be formed by pressing, forming and spatter deposition, or the like.

While the exemplary embodiment of the present invention has described securing head suspension 2 and base arm 4 by laser welding, it is not so limited, and a no-securing way to assemble the invention easily such as by securing the head suspension to actuator axis 10 by clamping, may be used as well. In this case, by using a dimension correction piece such as a shim or the like between head suspension 2 and base arm 4, the biasing force of slider 1 against disk 12 can be controlled.

Next, a head support device having another structure in accordance with exemplary embodiment 1 of the present invention is described with reference to FIGS. 4 (a) and 4 (b). FIG. 4 (a) is a sectional side view of the head support device having the structure. FIG. 4 (b) is a plan view of the head support device viewed from the slider side. Different from the aforementioned embodiment described with reference to FIGS. 2 and 3, a head suspension is not incorporated with a spring member in the example shown in FIG. 4.

Figure 4A:
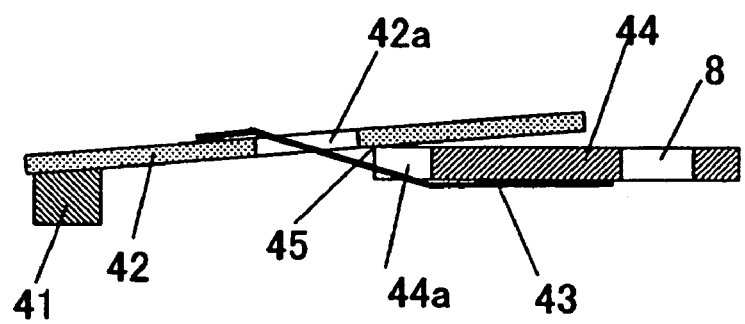
FIG. 4 (*a*) is a sectional view of the head support device with another structure in accordance with exemplary embodiment 1 of the present invention.
Figure 4B:
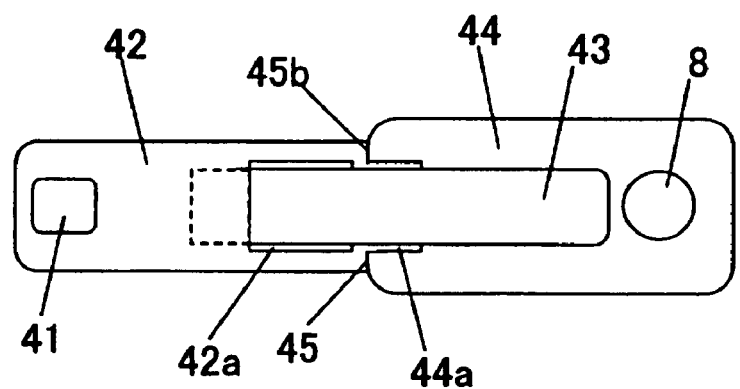

In FIG. 4, head suspension (or support arm) 42 and base arm 44 have apertures 42a and 44a, respectively, and spring member 43 is disposed through apertures 42a and 44a to form pivot fulcrum 45b at the tip edge of base arm 44. Spring member 43 is secured on the surface (the top surface of head suspension 42 in FIG. 4a), opposite to the surface equipped with slider 41, of head suspension 42, and spring member 43 is secured on the surface (the bottom surface of base arm 44 in FIG. 4a), opposite to the surface provided with pivot fulcrum 45b. The structure enables bending portions of spring member 43 to easily apply slider 41 with a reasonable biasing force against disk 12 because a portion of base arm 44 is located in the bending area of spring member 43. Additionally, the structure in which base arm 44 holds head suspension 42 at two pivot fulcrums 45b provided at both sides with respect to the width direction can improve the shock resistance and stability for twisting effectively. In the structure shown in FIG. 4, head suspension 42 is balanced due to its weight only without using any balancer, but the present invention is not so limited. An additional balancer, for example, can be provided on the side opposite to slider 41. The introduction of a balancer can shorten the length of the head suspension and can realize a downsizing of the head support device eventually.

Figure 5:
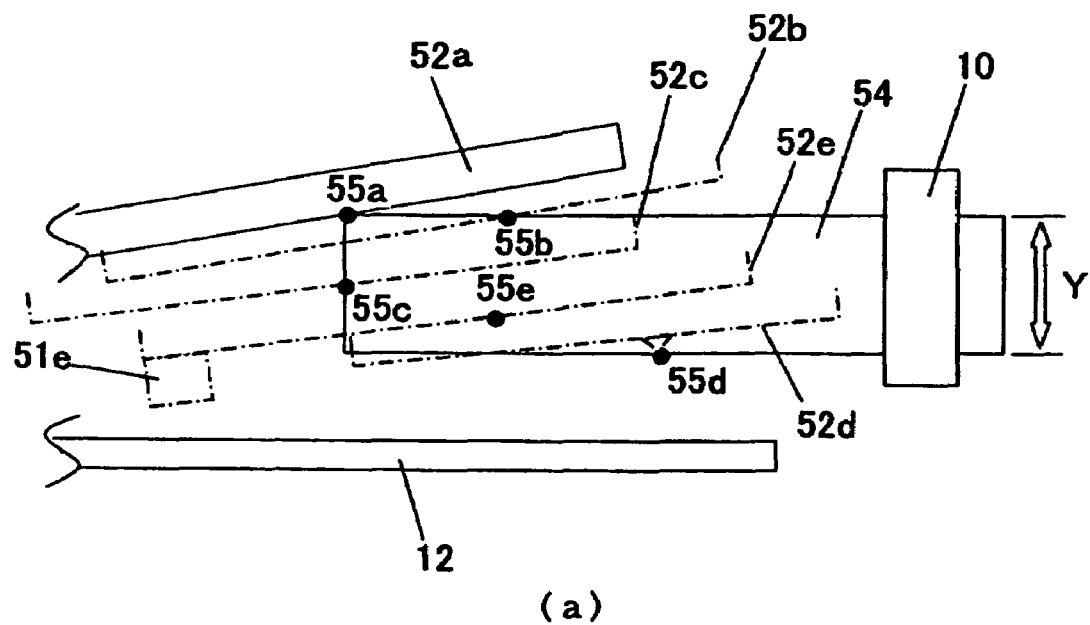
FIG. 5 (*a*) is an exploded sectional view in the vicinity of the base arm of the head support device in accordance with exemplary embodiment 1 of the present invention.
Figure 5:
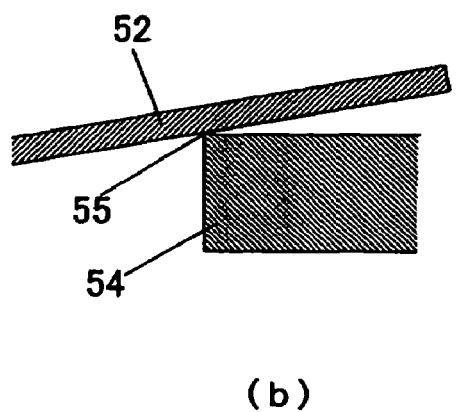
Figure 5:
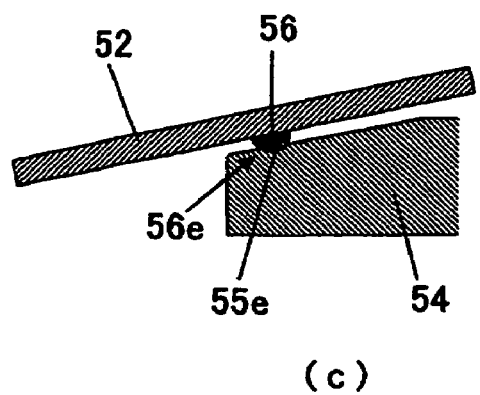

Next, the positioning to dispose pivot fulcrums in the exemplary embodiment 1 of the present invention is described. As already shown in FIG. 2 (b), FIG. 5 (a) is an exploded sectional view in the vicinity of the base arm of the head support device in accordance with exemplary embodiment 1 of the present invention. In exemplary embodiment 1 of the present invention, the pivot fulcrum is disposed at the tip of the base arm, but some pivot fulcrums are disposed at intermediate positions in the following examples. However, even in such examples, the pivot fulcrum is disposed at the tip position practically providing an aperture or the like. In the following description, the pivot fulcrum is considered to be located at the tip even if the pivot fulcrum is in an intermediate location The area for the pivot fulcrums to be located is determined by a projection image of a sectional side view of base arm 54. Denoting Y as the thickness, the area is located on the top and bottom surfaces and within the range designated by Y as shown in FIG. 5 (a). The position from actuator axis 10 in the longitudinal direction on base arm 54 is not limited specifically and defined according to design conditions. For instance, the pivot fulcrum position includes pivot fulcrum 55a corresponding to the tip edge of base arm 54; pivot fulcrum 55b provided on the top surface; pivot fulcrum 55c provided in a lower position from the tip edge; pivot fulcrum 55d provided on the bottom surface; and pivot fulcrum 55e provided internally, or the like. In FIG. 5, head suspension 52a to head suspension 52e are shown with respect to the corresponding position pivot fulcrum 55a to pivot fulcrum 55e. With respect to the slider, FIG. 5(a) shows slider 51e only corresponding to head suspension 52e and pivot fulcrum 55e.

FIG. 5 (b) shows a structure of a pivot fulcrum provided at the tip edge of base arm 54, and FIG. 5 (c) shows a structure of pivot fulcrum provided internally. In FIG. 5 (c), domed or semi-cylindrical shaped protrusion 56 provided on head suspension (or support arm) 52 is fitted to concave 56e formed on an inclined potion of a distal end of base arm 54 to form pivot fulcrum 55e. As is clear from the examples, a downsized and especially low-profile head support device can be produced by suitable selection and combination of the position of the pivot fulcrum, thickness and length of the head suspension and base arm, and height of the slider or the like. When the spring member is secured on a lower level surface of the base arm than the pivot fulcrum, the spring member and base arm will share elastic deformations.

In the description of exemplary embodiment 1 of the present invention, though a slider is used as a subsidiary component to mount a head on the head suspension via the slider, it is not so limited. In fact, the head may be mounted on the head suspension directly. Moreover, a slider equipped with a magnetic head can be installed in a so-called head gimbal assembly in which a thin metal plate made of, for instance, stainless steel or the like is incorporated with a flexible wiring substrate. The head gimbal assembly has a structure in which a head is held with the head suspension via a plurality of subsidiary components to perform smoother movements of the slider.

Figure 6:
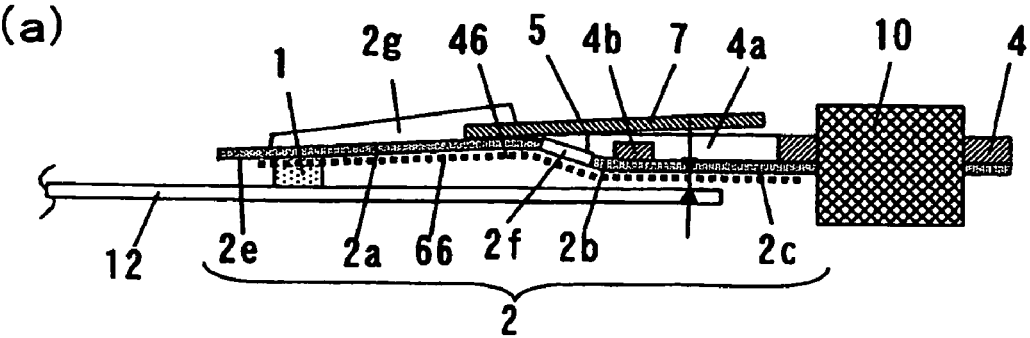
FIG. 6 (*a*) is a sectional side view taken along the centerline of the support arm of the disk drive in accordance with exemplary embodiment 1 of the present invention.
Figure 6:
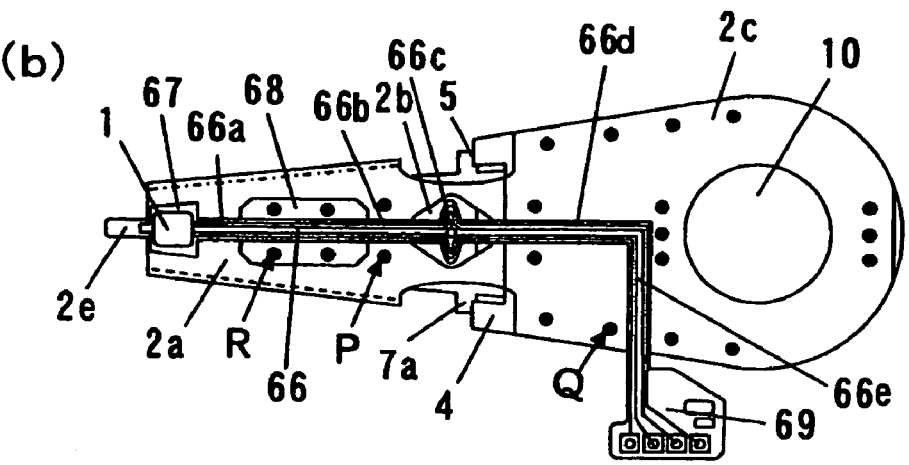
Figure 6:
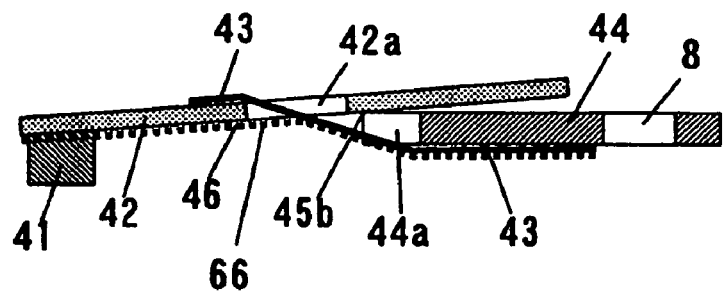

As to the so-called head gimbal assembly in which a thin metal plate made of, for instance, stainless steel is incorporated with a flexible wiring substrate, an example of the structure will be described briefly with respect to FIG. 6. In particular, slider 1 equipped with a head such as a magnetic head is secured on holder 2a of head suspension 2 directly or via a flexure for head wiring as shown in FIG. 6. FIG. 6 shows a structure of the head suspension of the HDD used in exemplary embodiment 1 of the present invention secured to the slider via a flexure for head wirings. FIG. 6 (a) is a sectional side view taken along the centerline of the head suspension of the disk drive. FIG. 6 (b) is a plan view of the head suspension viewed from the disk side. FIG. 6 (c) is a sectional side view taken along the centerline of the head suspension with another structure.

In FIG. 6 (a) and FIG. 6 (c), a flexure for head wiring is shown with a heavy dotted line. As shown in FIG. 6 (a) and FIG. 6 (b), flexure 66 consists of slider holder 67 combined with a so-called head gimbal assembly made of thin metal plate of, for instance, SUS; holder fastening 68 made of thin metal plate of, for instance, SUS; and flexible wiring board (FPC) including head signal wirings, incorporated all together. Flexure 66 is secured to head suspension 2; to slider holder 67 on the side of slider 1; and to holder fastening 68 in the center of holder 2a, respectively. The tip of a dimple (not shown in FIG. 6) provided on head suspension 2 is pressed to touch flexure 66, enabling slider 1 secured to flexure 66 to move pivotally around the tip of the dimple freely.

Flexure 66 consists of slider holder 67 made of thin metal plate of, for instance, SUS; intermediate portions 66a, 66b and 66d without holder fastening 68; buffer 66c; and end portion 66e composed of flexible wiring board (FPC) that can move freely. Flexure 66 is secured to head suspension 2 in the vicinity of holder 2a of head suspension 2 at a plurality of welding points on holder fastening 68 as indicated by R by a well known way such as laser welding or the like. Moreover, between intermediate portion 66b and 66d, buffer 66c is provided in the vicinity of aperture 2f, and buffer 66c is then bent approximately perpendicularly near the center of mounting portion 2c and is connected to terminal 69 via end portion 66e.

According to the aforementioned structure, flexure 66 provided in the head suspension of the HDD used in exemplary embodiment 1 of the present invention is secured to head suspension 2 using slider holder 67, made of thin stainless plate only partly, and holder fastening 68. The other portions are composed only of flexible wiring board (FPC) that can move freely, and the rigidity of flexure 66 does not influence on the rigidity or the balancing characteristics of the head support device itself because the wiring has no guides from the bottom surface to top surface of base arm 4. The same flexure structure as mentioned above can also be used for flexure 66 provided on the head support device having a different structure of the HDD used in exemplary embodiment 1 of the present invention as shown in FIG. 6 (c). Needless to say, the effects of the flexure will be the same with the HDD structure as shown in FIG. 6 (c).

In exemplary embodiment 1 of the present invention, a balancer is used as one of the main components, but a structure without the balancer is also possible by using another way to provide a spring member away from the head suspension separately or the like.

The head support device of the present invention is used for data processing devices in exemplary embodiment 1, but it can provide the same effects when used for contactless data reproduction devices such as an optical disk drive or a magneto optical disk drive. A head support device composed of a plurality of disks and head suspensions can increase the data storage capacity effectively, wherein a double-sided disk is sandwiched by a pair of two-headed suspensions.

Though the shape of pivot fulcrum 55e is described to be rod shaped in the description of FIG. 5 (c) of exemplary embodiment 1, the shape is not so limited, and a ball shaped or cylindrical shaped pivot fulcrum will be acceptable.

As mentioned above, the present invention can realize a significantly low-profile head support device by using the pivot fulcrum provided on the base arm to attach the head suspension to the base arm, with little increase in the thickness of the base arm itself. The head support device can reliably prevent the head and disk from damage caused by a clash of the slider on the disk, so as to realize a head support device with little vibration and excellent shock resistance. Moreover, a vibration mode such as twisting or the like rarely occurs, enabling a speedier positioning at target tracks on a disk and an improved reading/writing access time.

Exemplary Embodiment 2

Figure 7:
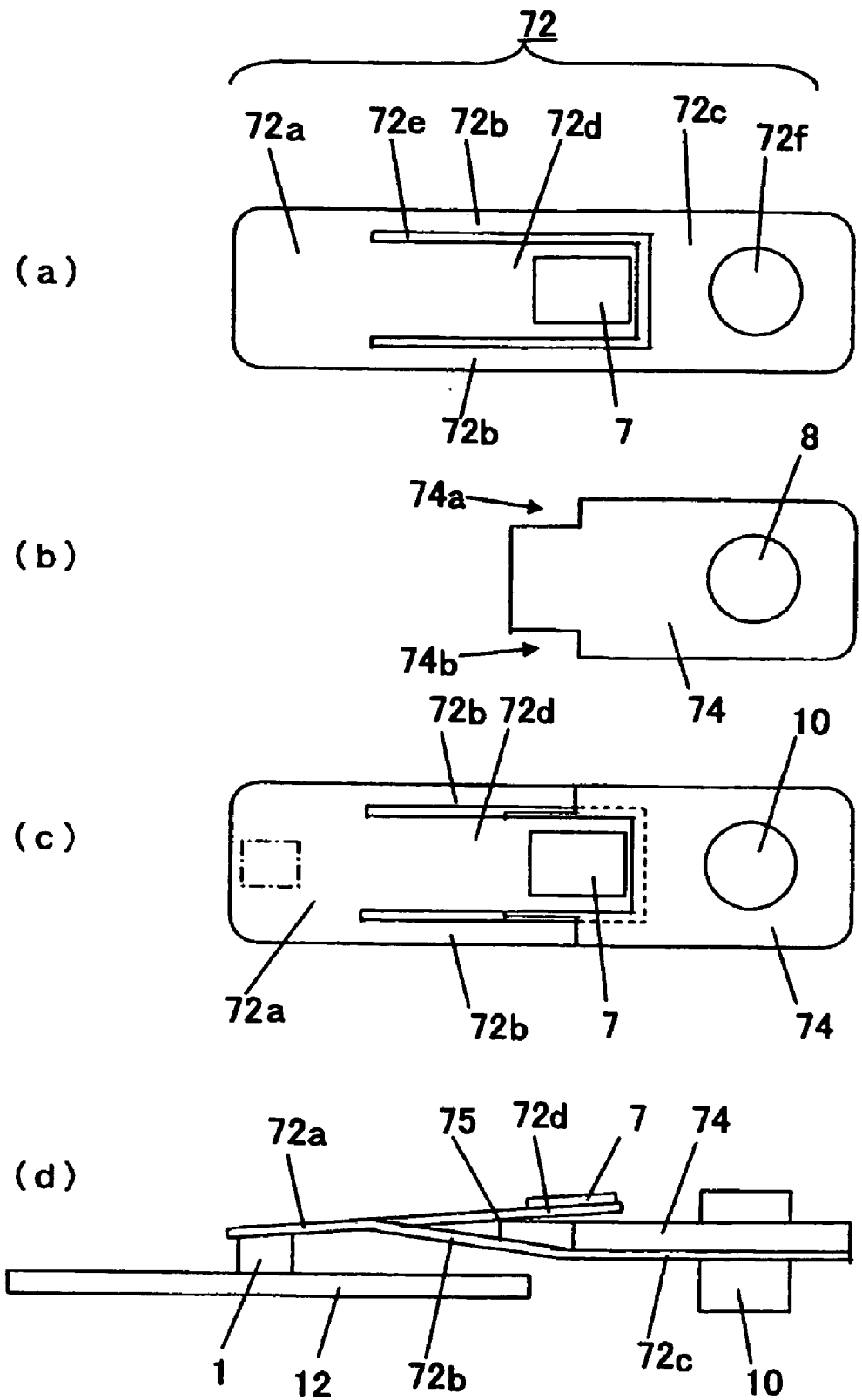
FIGS. 7 (a) to 7 (d) are plan views and a side view of the main structure of the head support device in accordance with exemplary embodiment 2 of the present invention.
Figure 8:
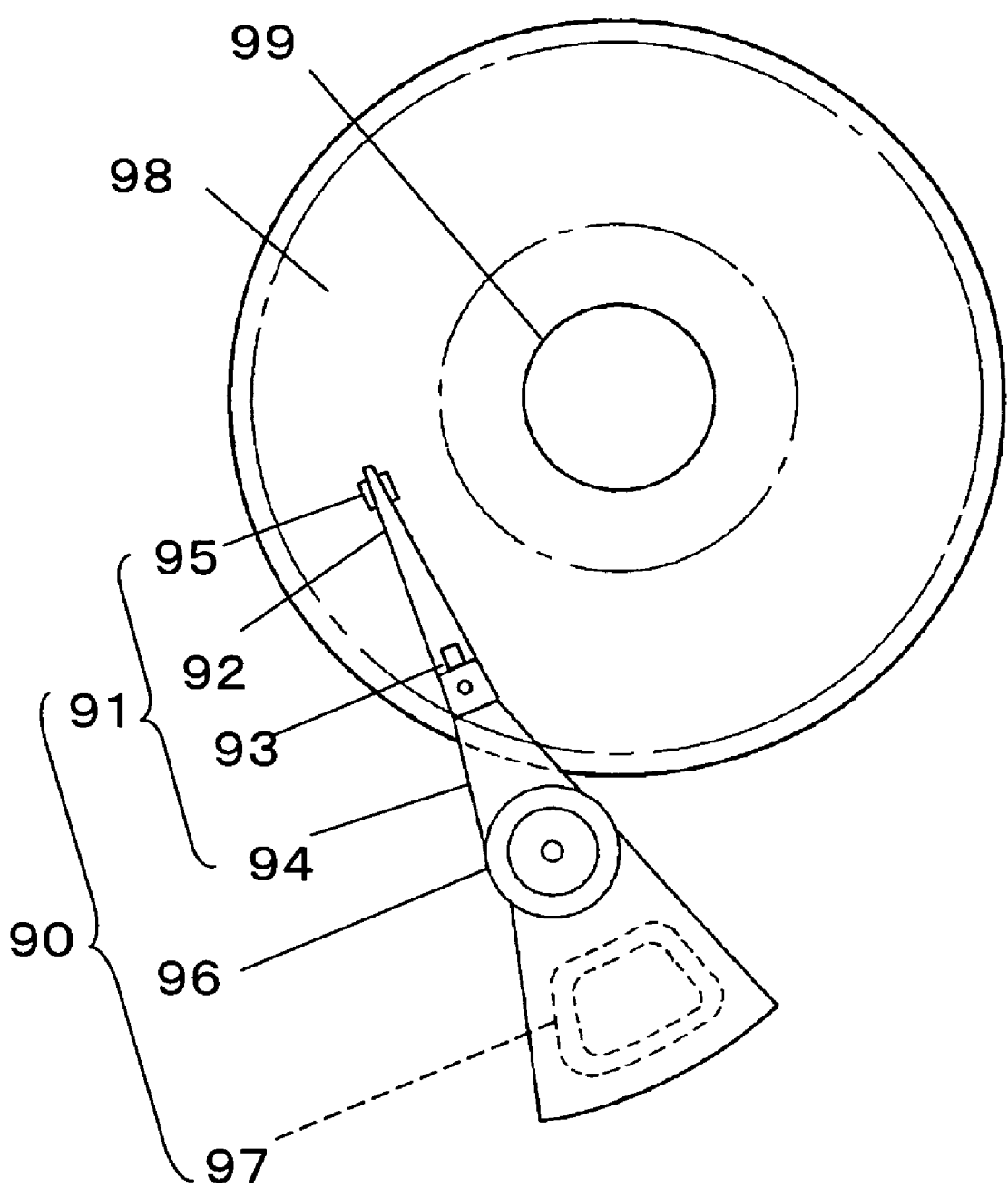
FIG. 8 is a plan view showing the main structure and the relation between the head support device and the disk of a conventional device.
Figure 9:
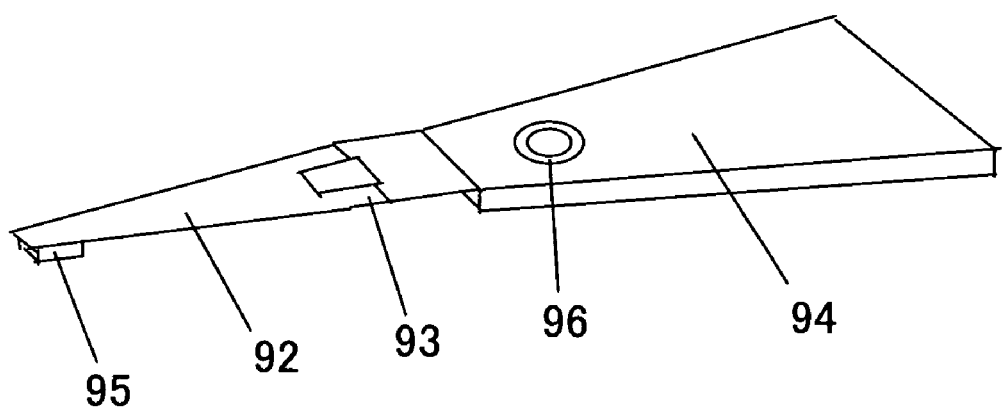
FIG. 9 is a perspective view showing the main structure of a conventional head support device.

FIG. 7 includes plan views and a side view of the main structure of the head support device in accordance with exemplary embodiment 2 of the present invention. FIG. 7 (a) is a plan view showing the shape of head suspension (or support arm) 72, FIG. 7 (b) is a plan view showing the shape of base arm 74, FIG. 7 (c) is a plan view showing the assembly of head suspension 72 secured on actuator axis 10 provided in bearing 8 pivotally, and FIG. 7 (d) is a side view showing the head support device loaded on disk 12.

Different from exemplary embodiment 1, holder 72a, spring members such as plate springs 72b, pivoting portion 72d to lay on pivot fulcrum 75 are incorporated using two spring members 72b provided on both sides of head suspension 72, in exemplary embodiment 2 of the present invention. Head suspension 72 of exemplary embodiment 2 of the present invention comprises: holder 72a; spring members 72b; mounting portion 72c; pivoting portion 72d; slit aperture 72e; and circular through hole 72f. Spring members 72b are formed in an elongated shape in intermediate positions between holder 72a and mounting portion 72c. The head suspension 72 is made of materials having spring characteristics such as stainless steel. Pivoting portion 72d surrounded by slit apertures 72e is raised and is inclined with respect to mounting portion 72c by elastic deformations of spring members 72b. On the other hand, base arm 74 is provided with two notches 74a on both sides in one end and circular through hole 72f to fit actuator axis 10 rotatably in bearing 8 at the other end. Next, raising pivoting portion 72d of head suspension 72, the distal end of base arm 74 sandwiched by two notches 74a is inserted under pivoting portion 72d. Then mounting portion 72c of head suspension 72 is stacked on base arm 74 and secured by spot welding or the like to form an incorporated structure. Incorporated head suspension 72 and base arm 74 is secured pivotally on actuator axis 10 provided in bearing 8. Consequently, base arm 74 can suspend head suspension 72 movably in vertical directions with the tip edge acting as pivot fulcrum 75, as shown in FIG. 7 (c) and FIG. 7 (d). Balancer 7 is provided on holder 72a at the end opposite to the side equipped with slider 1 across pivot fulcrum 75. An electrical circuit can be an alternative to balancer 7. The position and mass of balancer 7 is controlled to determine the position of the center-of-mass of head suspension 72, and the biasing force of slider 1 against the disk surface is a predetermined value The flexure having the same structure as described with reference to FIG. 6 on the head support device in exemplary embodiment 1 of the present invention can be used also for the head support device in exemplary embodiment 2 of the present invention.

Upon reading and/or writing on disk 12, head suspension 72 is suspended on pivot fulcrum 75 of base arm 74 in a slightly inclined posture against base arm 74, keeping mounting portion 72c equipped with slider 1 in a lower position, by the elastic deformation of two spring members 72b provided on both sides of head suspension 72 to apply a predetermined biasing force against slider 1 in a direction perpendicular to the disk surface.

With the aforementioned simplified structure, the head support device used in exemplary embodiment 2 can perform the same effects as realized in exemplary embodiment 1. Additionally, as the number of parts is reduced, quality fluctuation due to the parts quality and assembling accuracy can be minimized. As mentioned above, the present invention can realize a significantly low-profile head support device due to the pivot fulcrum provided on the base arm for attaching the head suspension to the base arm, minimizing the increase in the thickness of the base arm itself. The structure of the invention can reliably prevent the head suspension from touching the disk, and can reliably prevent the head and disk from damage caused by a clash of the slider on the disk in case of external shock or loading/unloading, enabling the head support device to experience little vibration and have excellent shock resistance. Moreover, as the resonance frequency of the head suspension can be increased, the vibration mode such as twisting or the like occurs only slightly, then additional movement is not necessary to stabilize the vibration mode, enabling a more speedier positioning and an improved read/write access time.

The head support device of the present invention can be used in various kinds of information devices such as data processing devices, magneto optical disk drives, optical disk drives or the like.

What is claimed is:

1. A head support device for supporting a read and/or write head for recording information on a recording medium and/or reproducing information from the recording medium, the recording medium rotating around an axis of rotation of the recording medium, said head support device comprising:
   a base arm operable to pivot about a first axis that is parallel to and spaced apart from the axis of rotation of the recording medium;
   a support arm coupled to said base arm so as to be pivotable about the first axis with said base arm, said support arm being operable to pivot about a second axis relative to said base arm, the second axis extending through a pivot fulcrum and being perpendicular to the first axis, said pivot fulcrum being located at one of a top surface of said base arm, a bottom surface of said base arm, and a position between said top surface and said bottom surface with respect to a thickness direction of said base arm;
   a flexure attaching a slider to a first end of said support arm, said flexure being fixed to said support arm at said pivot fulcrum; and
   a spring member coupling said support arm to said base arm for applying a thrust force to the head, said spring member having a rigidity lower than a rigidity of said support arm.

2. The head support device of claim 1, wherein said pivot fulcrum is located at a tip of said base arm of a side of the head.

3. The head support device of claim 1, wherein said pivot fulcrum is located at a tip edge of said base arm of a side of the head.

4. The head support device of claim 1, wherein a center of mass of said support arm is located at said pivot fulcrum.

5. The head support device of claim 1, wherein said base arm has an aperture.

6. The head support device of claim 5, wherein a portion of said support arm is located within said aperture.

7. The head support device of claim 5, wherein said aperture comprises a first aperture, said base arm further having a second aperture.

8. The head support device of claim 7, wherein a portion of said support arm is located within at least one of said first aperture and said second aperture.

9. The head support device of claim 1, wherein said spring member is made of a resilient material.

10. The head support device of claim 1, wherein said spring member is secured to said base arm.

11. A disk drive comprising:
    a recording medium;
    a rotation driving mechanism for rotating said recording medium about an axis of rotation of said recording medium;
    a read and/or write head for recording information on said recording medium and/or for reproducing information from said recording medium;
    a base arm operable to pivot about a first axis that is parallel to and spaced apart from the axis of rotation of the recording medium;
    a support arm coupled to said base arm so as to be pivotable about the first axis with said base arm, said support arm being operable to pivot about a second axis relative to said base arm, the second axis extending through a pivot fulcrum and being perpendicular to the first axis, said base arm being located between said support arm and said recording medium;
    a flexure attaching a slider to a first end of said support arm, said flexure being fixed to said support arm at said pivot fulcrum; and
    a spring member coupling said support arm to said base arm for applying a thrust force to the head, said spring member having a rigidity lower than a rigidity of said support arm;
    wherein said pivot fulcrum is located at one of a top surface of said base arm, a bottom surface of said base arm, and a position between said top surface and said bottom surface with respect to a thickness direction of said base arm.

12. The disk drive of claim 11, further comprising:
    an assembly incorporated with said support arm and said spring member at a side of said support arm and said spring member closest to said recording medium; and
    head signal wirings connecting said head to said base arm through said support arm, said spring member, and said assembly.

* * * * *